(12) United States Patent
Barthelemy et al.

(10) Patent No.: US 8,973,428 B2
(45) Date of Patent: Mar. 10, 2015

(54) METHOD AND DEVICE FOR MEASURING A PART IN A TURBINE ENGINE

(75) Inventors: Denis Barthelemy, Cesson (FR);
Jean-Dominique Rossio, Bagnolet (FR);
Eric Monnier, Moisenay (FR); Francois Pagliano, Ozouer le Voulgis (FR);
Pierre Albert Marie Martin,
Pontault-Combault (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/122,588

(22) PCT Filed: May 15, 2012

(86) PCT No.: PCT/FR2012/051090
§ 371 (c)(1),
(2), (4) Date: Nov. 26, 2013

(87) PCT Pub. No.: WO2012/164192
PCT Pub. Date: Dec. 6, 2012

(65) Prior Publication Data
US 2014/0096601 A1  Apr. 10, 2014

(30) Foreign Application Priority Data
May 27, 2011  (FR) .................... 11 54677

(51) Int. Cl.
| G01M 15/14 | (2006.01) |
| F01D 25/28 | (2006.01) |
| F04D 29/32 | (2006.01) |
| G01B 3/04 | (2006.01) |
| G01B 3/14 | (2006.01) |
| G01B 5/20 | (2006.01) |
| G01B 11/24 | (2006.01) |

(Continued)

(52) U.S. Cl.
CPC ............. *G01M 15/14* (2013.01); *F01D 25/285* (2013.01); *F04D 29/324* (2013.01); *G01B 3/04* (2013.01); *G01B 3/14* (2013.01); *G01B 5/205* (2013.01); *G01B 11/24* (2013.01); *F04D 27/001* (2013.01); *F04D 29/563* (2013.01)
USPC ....................................... 73/112.01

(58) Field of Classification Search
USPC ....................................... 73/112.01
See application file for complete search history.

(56) References Cited

U.S. PATENT DOCUMENTS

| 4,825,259 A | 4/1989 | Berry |
| 5,644,394 A * | 7/1997 | Owens ................ 356/241.5 |

(Continued)

FOREIGN PATENT DOCUMENTS

| JP | 58 68601 | 4/1983 |
| WO | 2010 055263 | 5/2010 |

OTHER PUBLICATIONS

International Search Report Issued Sep. 3, 2012 in PCT/FR12/051090 Filed May 15, 2012.

(Continued)

*Primary Examiner* — Freddie Kirkland, III
(74) *Attorney, Agent, or Firm* — Oblon, McClelland, Maier & Neustadt, L.L.P.

(57) ABSTRACT

A device for measuring a part in a turbine engine, including a rod including a portion with a profile that corresponds to a profile of a portion of a calibration part of a same type as a part under examination, the portion of the rod further including visible marks for remote measurement arranged along its length.

13 Claims, 7 Drawing Sheets

(51) Int. Cl.
*F04D 27/00* (2006.01)
*F04D 29/56* (2006.01)

(56) References Cited

U.S. PATENT DOCUMENTS

| | | | |
|---|---|---|---|
| 5,803,680 A | 9/1998 | Diener | |
| 6,341,936 B1 * | 1/2002 | Cowie et al. | 415/1 |
| 6,459,481 B1 | 10/2002 | Schaack | |
| 6,899,593 B1 * | 5/2005 | Moeller et al. | 451/6 |
| 6,910,278 B2 * | 6/2005 | Holder | 33/562 |
| 6,945,931 B2 * | 9/2005 | Ogawa | 600/118 |
| 7,097,539 B2 * | 8/2006 | Moeller et al. | 451/6 |
| 7,112,118 B1 * | 9/2006 | Moeller et al. | 451/6 |
| 7,231,817 B2 * | 6/2007 | Smed et al. | 73/112.01 |
| 8,039,773 B2 * | 10/2011 | Spallek et al. | 219/121.63 |
| 2004/0148793 A1 | 8/2004 | Holder | |
| 2005/0232767 A1 | 10/2005 | Holder | |
| 2008/0148587 A1 | 6/2008 | Goodrich | |

OTHER PUBLICATIONS

French Search Report Issued Sep. 27, 2011 in French Application No. 11 54677 Filed May 27, 2011.

* cited by examiner

METHOD AND DEVICE FOR MEASURING A PART IN A TURBINE ENGINE

The invention relates to a method and a device for measuring a part in a turbine engine, such as an airplane turbojet.

Conventionally, a turbine engine comprises high-pressure and low-pressure compressors feeding air to a combustion chamber, and high-pressure and low-pressure turbines situated downstream. Each compressor and each turbine has alternating stationary guide vanes and moving wheels carrying blades that are surrounded by a casing.

In operation, it can happen that ice or foreign bodies penetrate into the inside of the engine and impact against the compressor blades. The blade tips and also the blade leading and trailing edges are particularly subject to deformation as a result of an impact, since these zones are thinner than the remainder of the blade.

In the context of maintaining an engine, airlines need to perform non-destructive inspection operations for measuring the deformation of the above-mentioned zones. Deformation in those zones can be particularly critical for proper operation of an engine, since deformation leads to a disturbance in the flow of air passing through the compressor, thereby leading to a reduction in the compression ratio of the compressor, a reduction in the performance of the engine, and a reduction in the operating margin of the engine.

This inspection is performed by means of an endoscope, which is an elongate optical instrument made up of a tube housing optical means for transmitting images from its distal end to display means.

The endoscope is inserted in the engine via an endoscope orifice formed in the casing between two guide vanes. The distal end of the endoscope is steerable so as to be capable of being positioned facing the zone for inspection.

In particular, the junction zone between the tip of a blade and its leading edge is a zone that needs to be inspected regularly. This junction zone is referred to below in the present description as the upstream blade corner. Deformation of the upstream blade corner is measured on an image of the upstream blade corner. On the image, the operator measures the distance between the beginning of the deformation on the leading edge of the blade and the radially outer end of the leading edge of the blade.

Nevertheless, this measurement is not satisfactory, since the position of the distal end of the endoscope relative to the leading edge of the blade is not known. Furthermore, the viewing angle of the endoscope is likewise not known. This viewing angle is the angle between the observation axis of the distal end of the endoscope and a plane containing the axis of the compressor and the leading edge of the blade. This leads to the deformation of the upstream corner of the rotor blade being overestimated or underestimated.

When it is overestimated, that leads to the engine being removed early to a maintenance workshop in order to replace the deformed blade(s), which increases the cost of operating the engine. Underestimating the deformation of the upstream blade corner can lead to an incident while the engine is running. The unwanted flow of air over blade tips can lead to the compressor surging, i.e. to the flow direction of the air stream through the compressor being reversed, and can lead to flames coming from the combustion chamber and penetrating into the compressor, which can damage the compressor, and in certain very critical circumstances can lead to the engine stopping.

Another difficulty associated with the use of endoscopes is their small solid observation angle, which means that it is not possible to observe defects beyond 40 millimeters (mm), even though deformation of an upstream blade corner may extend over more than 100 mm.

In order to improve the accuracy with which deformation of the rotor blade upstream corners is measured, one method consists in using a visible mark placed on the suction side face of the blade in the immediate proximity of the upstream corner of the blade. This visible mark is in the form of an ink mark that is applied during fabrication of the blade, e.g. by means of a pad. Thus, when an operator observes the blade with the help of the endoscope, there is a visible mark on the blade that enables the operator to make a better estimate of the dimensions of the deformation of the upstream blade corner by comparing the size of the mark with the dimensions of the deformation of the upstream blade corner. Nevertheless, because of erosion and because of operating constraints inside the high-pressure compressor, such an ink mark disappears progressively during operation of the engine. Furthermore, measuring the dimensions of the deformation of an upstream blade corner with the help of such a visible mark is found to be relatively inaccurate because it is not possible to locate the beginning of the deformation along the leading edge of the blade and along the blade tip.

A particular object of the invention is to provide a solution to those problems that is simple, inexpensive, and effective, making it possible to avoid the drawbacks of the prior art.

To this end, the invention provides a method of measuring the deformation of a part in a turbine engine by means of a device comprising a rod having a portion with a profile that corresponds to the profile of a portion of a calibration part of the same type as the part under examination, said portion of the rod further including visible marks for remote measurement arranged along its length, the method being characterized in that it consists in performing the following steps:

a) inspecting the profile of the rod in three dimensions with the help of a three-dimensional model of the profile of the portion of the calibration part;

b) engaging the rod in an endoscope orifice in a casing of the engine;

c) positioning and fastening the shaped portion of the rod on the portion of the part for inspection that corresponds to the portion of the calibration part;

d) introducing an endoscope inside the casing of the engine;

e) measuring the deformation of the portion of the part for inspection with the help of the endoscope, and then f) withdrawing the rod from the inside of the engine and performing a step a) once more in order to verify that the rod has not been subjected to deformation during step b).

According to the invention, the method uses a device in which a portion of a rod has a shape that corresponds to the shape of a portion of a calibration part that is identical to the part for inspection. In this way, the operator can position the shaped portion of the rod in the proximity of the portion of the part for inspection and can determine the extent of the deformation along said portion by means of the visible marks for remote measurement that are arranged along the shaped portion of the rod.

In order to inspect a leading edge in an engine, the rod has a shaped portion matching the leading edge. The rod is inserted into the inside of the engine through an examination orifice provided for this purpose in a casing surrounding the blades. The rod is positioned against the leading edge and the visible marks of the shaped portion of the rod make it possible to evaluate the position of the deformation along the leading edge, and also to evaluate its extent.

In order to inspect a moving blade tip, the same operation as that described in the above paragraph is performed at using a rod having a shaped portion that matches the tip of a calibration blade.

Unlike the prior art, the measurement is completely independent of the positioning of the endoscope relative to the portion in which it is desired to measure deformation.

The initial and final steps of inspecting the shape of the rod serve to guarantee that the deformation measurement performed on the portion of the part is performed with a rod of shape that does indeed correspond to the shape of the portion of the calibration part.

When the part is a rotor blade in an engine, the method is performed on two portions of the blade in succession, one of which portions is the leading edge and the other of which portions is the tip of the blade.

Performing a measurement along the leading edge of a blade makes it possible to obtain information about the extent of the deformation in the height direction of the blade, and performing a measurement along the tip of a blade makes it possible to obtain information about the extent of the deformation in the longitudinal or width dimension of the blade. Two independent and accurate measurements are thus obtained about the extent of the deformation of the upstream blade corner. Each measurement is also more accurate than a measurement as performed in the prior art, since it is performed with a rod having a shaped portion that matches the edge being studied and that incorporates visible marks along its length.

According to another characteristic of the invention, the visible marks for remote measurement comprise graduations that are regularly distributed along the length of the shaped portion of the rod.

Advantageously, each graduation is made in the form of a colored line with the color of each line differing from the colors of each of the adjacent colored lines. Incorporating colored graduations makes it easier to measure the deformation since it is easier to distinguish between two graduations of different colors than between adjacent graduations of the same color. This is particularly true when measuring deformation along the tip of a blade. Under such circumstances, the distal end of an endoscope inserted inside the engine is positioned so as to be substantially flush relative to the shaped portion of the rod because of the small amount of space available at the blade tip. Incorporating colored graduations makes it much easier to measure deformation.

According to another characteristic of the invention, the device used with the method includes fastening and positioning means for fastening and positioning said portion of the rod in a stationary position in alignment with the portion of the part under examination that corresponds to the portion of the calibration part.

When the part is a rotor blade arranged inside a casing of a turbine engine, the fastening and positioning means comprise an endpiece engaged on the end of the rod remote from the above-mentioned portion of the rod, the endpiece being for fastening in an endoscope orifice in the casing of the engine and including an orifice for passing an endoscope.

The positioning means include a rim or hook arranged at the free end of the shaped portion of the rod and serving as an abutment for positioning the rod on the part under examination.

When the portion for inspection is a rotor blade leading edge, the rod having a shaped portion matching the leading edge of the blade is inserted inside the engine, and the rotor is turned until the rim comes into contact with the suction side of the blade, which corresponds to the shaped portion of the rod being correctly aligned with the leading edge.

In a practical embodiment of the invention, the shaped portion is connected to a second portion of the rod that is L-shaped. This L-shaped second portion serves to insert and bring the shaped portion of the rod up to the edge of the blade that is to be examined.

In an embodiment of the invention, the shaped portion of the rod follows the profile of the tip of a rotor blade and is inclined relative to the axis of the branch to which it is connected. This rod is particularly well adapted to measuring the deformation of a blade tip. It is necessary for the shaped portion to be inclined, since blade tips are generally inclined relative to the axis of the rotor in an engine compressor.

In another embodiment of the invention, the shaped portion of the rod follows the profile of the leading edge of a rotor blade and it extends substantially perpendicularly to the branch of the L-shape to which it is connected and in a direction going away from the other branch of the L shape. This rod is particularly well adapted to measuring the deformation of a blade leading edge.

The invention also provides a device for performing the above-described method, characterized in that it comprises a rod having a portion with a profile that corresponds to the profile of a portion of a calibration part of the same type as the part under examination, said portion of the rod further comprising visible marks for remote measurement arranged along its length, and in that it includes fastening and positioning means for fastening and positioning said rod portion in a stationary position in alignment with the portion of the part under examination that corresponds to the portion of the calibration part.

The invention also provides a carrying case for the above-described device. This case has support means for supporting at least one rod, these means comprising a plurality of studs, each supporting the rod at a predetermined height in such a manner that the contact points where the support studs make contact with the rod define a three-dimensional model of the profile of the portion of the calibration part.

With such a case, it is possible to verify that the rod has not being deformed while it was in use by replacing it in the case and checking that the rod is in contact with each of the support studs.

Other advantages and characteristics of the invention appear on reading the following description made by way of nonlimiting example and with reference to the accompanying drawings, in which.

Figure 1:
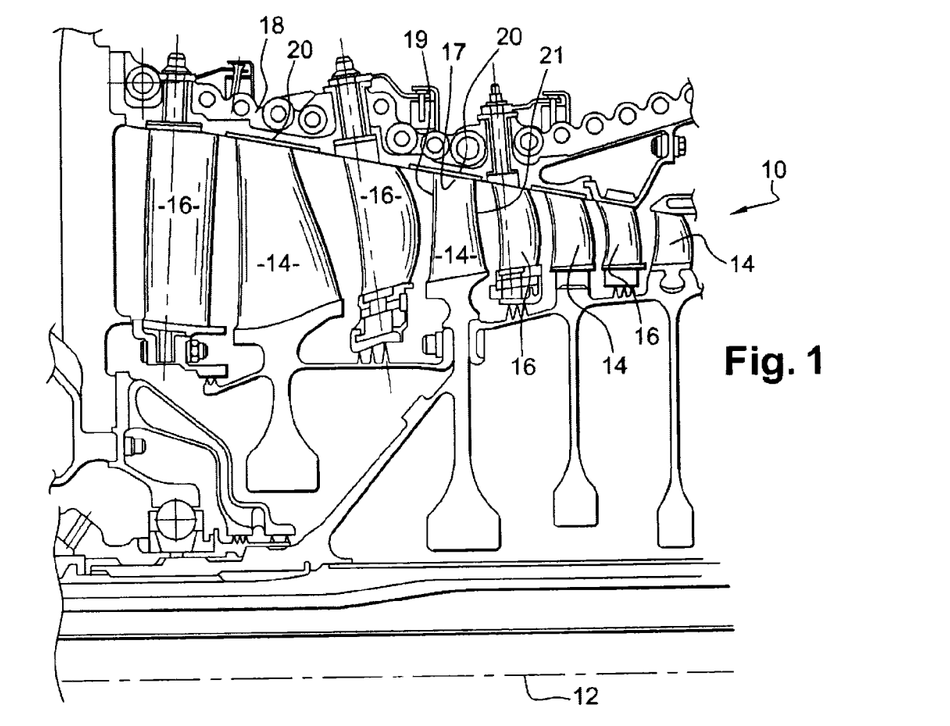
FIG. 1 is a fragmentary diagrammatic half-view in axial section of a high-pressure compressor of known type.

Reference is made initially to FIG. 1, which shows the upstream portion of a high-pressure compressor 10 seen in section on a plane containing the axis of rotation 12 of the turbine engine. The high-pressure compressor 10 comprises a plurality of wheels carrying blades 14 and assembled axially one after another, being arranged in alternation with rows of guide vanes 16 carried by a casing 18. Each compressor blade 14 has a blade tip 17 connecting an upstream leading edge 19 to a downstream trailing edge 21.

Panels of abradable material 20 are arranged in register with the tips of the rotor blades 14. These panels of abradable material 20 serve to limit the unwanted passage of air between the tips of the blades 14 and the outer casing 18.

Figure 2:
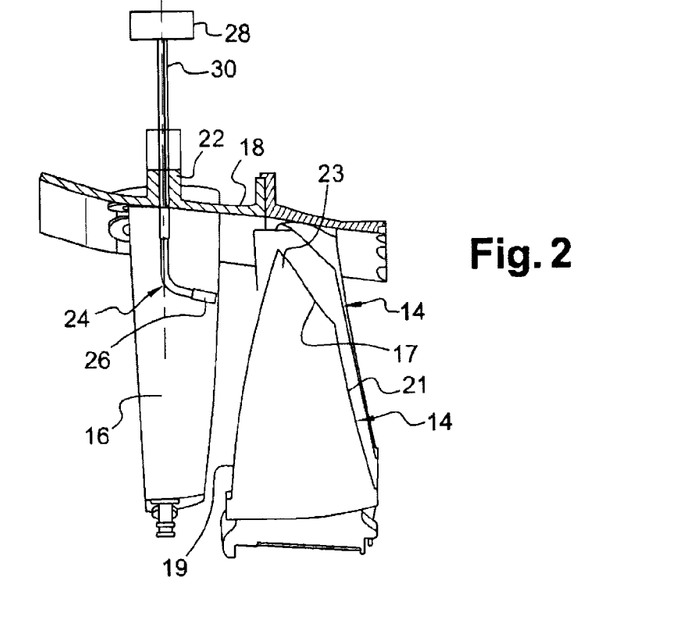
in FIG. 2 is a fragmentary diagrammatic view in perspective showing the use of an endoscope for visualizing an edge of a blade of the FIG. 1 compressor.

In operation, ice or foreign bodies can impact against the blades 14 and in particular against their upstream corners, i.e. the junction zones 23 between the leading edges 19 and the tips 17 of the blades (FIG. 2). These impacts can deform these blade corners 23 and lead to disturbance to the flow of air passing between the blades 14 in a given row and between the tips 17 of the blades 14 and the casing 18.

It is desirable to limit these air disturbances, which give rise to a loss of power from the engine and to an increase in fuel consumption, and which expose the engine to risks of the compressor surging, i.e. to a reversal of the flow of the stream of air therethrough.

When it is suspected that the upstream corners of the blades are deformed, then it is necessary to perform a maintenance operation so as to verify whether or not these deformations exist and, where appropriate, so as to quantify them in order to determine whether or not it is necessary to dismantle the engine in order to replace damaged blades.

For in situ inspection of the blades, the outer casing 18 of the high-pressure compressor 10 has one boss 22 per row of guide vanes 16 (FIG. 2). Each boss 22 has an orifice for passing an endoscope 24, which leads to the inside of the casing 18 between two consecutive guide vanes 16.

The endoscope 24 has means for optically transmitting images from its distal end 26 to an observation eyepiece 28 arranged at its proximal and 30. The endoscope 24 may also have means for adjusting the orientation of its distal end. Such means are well-known to the person skilled in the art.

In order to observe an upstream blade corner 23, the operator inserts the distal end 26 of the endoscope 24 into the endoscope orifice in the row of guide vanes 16 immediately upstream from the rotor blade 14 that is to be examined. Thereafter the distal end 26 of the endoscope is directed downstream so as to view the upstream corner of the blade 14 that is to be examined.

Thereafter, the operator takes an image of the upstream corner 23 of the blade and measures the distance between the beginning of the deformation on the leading edge of the blade and the radially outer end of the leading edge of the blade. The operator also measures the distance between the beginning of the deformation on the tip of the blade and the upstream end of the tip of the blade.

As explained above, this measurement is found to be very inaccurate since the positioning of the distal end of the endoscope 24 relative to the deformed zone along the leading edge and along the tip 17 of the blade is not known accurately, which introduces a large amount of error in the value of the deformation as measured in this way.

The invention provides a simple solution to the problems of the prior art by means of a rod 32 having a portion 34 that is shaped in such a manner as to have a profile that matches the profile of a portion of a calibration part of the same type as the part under examination, with remote measurement means being incorporated in the shaped portion 34 of the rod 32.

Figure 3:
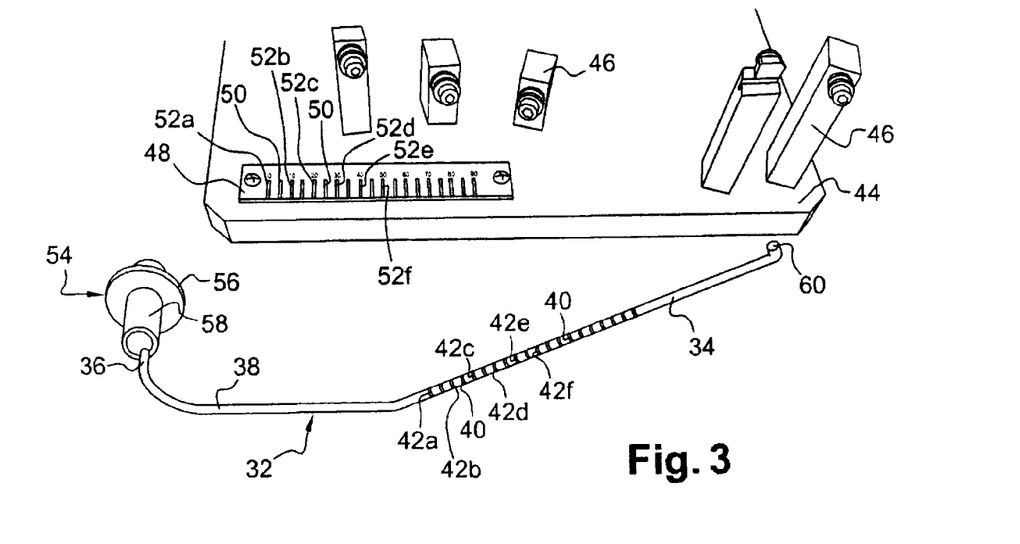
FIG. 3 is a diagrammatic view in perspective of a rod of the device of the invention, including a portion shaped to match the tip of a rotor blade of a high-pressure compressor.

In a first embodiment of the invention, the rod has a shaped portion 34 matching the shape of the tip of a calibration blade. The rod 32 has an L-shaped portion made up of a first branch 36 and a second branch 38 (FIG. 3). The end of the second branch 38 remote from the first branch 36 is connected to the shaped portion 34 having the shape of the profile of the tip 17 of a calibration blade. The shaped portion 34 forms a non-zero angle with the second branch. This angle is determined to match substantially the angle formed between the blade tip 17 and the longitudinal axis 12 of the compressor of the engine.

The shaped portion 34 of the rod 32 has graduations that are regularly spaced apart from one another along its length. Each graduation is made in the form of a colored line with the color of each line differing from the colors of adjacent colored lines. In FIG. 3, the shaped portion includes a plurality of white lines 40 that are regularly spaced apart from one another and that have second lines 42 of different colors interposed between them. These second lines define a pattern that repeats along the shaped portion, and within which the colors differ in pairs. For example, the repetitive pattern of colors may be as follows: yellow 42a, brown 42b, green 42c, red 42d, blue 42e, black 42f.

In FIG. 3, there can also be seen part of a plate 44 having a plurality of studs 46 that constitute a shape model suitable for checking the shape of the rod. The studs 46 are described in greater detail in the description below.

A metal strip 48 is fastened on the plate 44 and is graduated using a color code identical to that of the shaped portion of the rod. Thus, the metal strip has lines 50 of white color and lines 52 of other colors interposed between the lines of white color. The lines 52a, 52b, 52c, 52d, 52e, and 52f define a pattern that is identical to the pattern of the shaped portion 34 of the rod.

A length scale is arranged along the strip facing the lines 52.

In a practical embodiment of the invention, the colored lines 40, 42 and 50, 52 are spaced apart from one another by a distance of 5 mm.

The rod has fastener means and positioning means for fastening and positioning the shaped portion 34 in a stationary position in alignment with the blade tip 17. These means comprise an endpiece 54 having a projecting annular portion 56 at the end of a tubular portion 58. An orifice is formed in the thickness of the wall of the tubular portion 58 to receive the first branch 36 of the L-shaped portion of the rod 32, the free end of the tubular portion 58 being situated beside the connection between the two branches 36 and 38 of the L-shape.

The positioning means comprise a rim or hook 60 formed at the free end of the shaped portion 34, this rim 60 serving to come into abutment against the trailing edge 21 of the blade 14. This rim 60 is substantially perpendicular to the free end of the shaped portion 34 and it extends in a circumferential direction when the shaped portion 34 of the rod 32 is in alignment with the tip 17 of a rotor blade 14.

Figure 4:
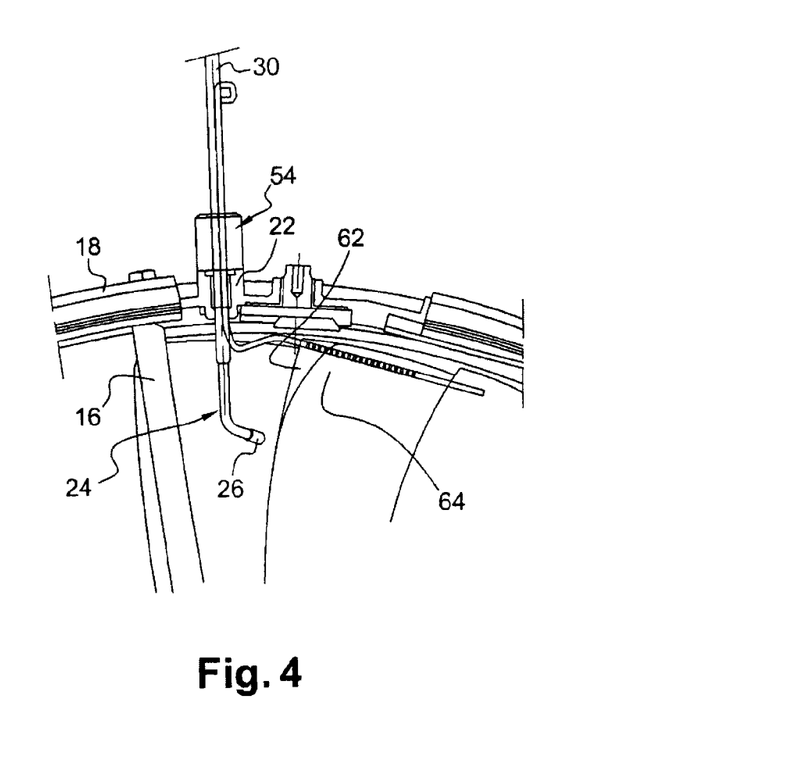
FIG. 4 is a fragmentary diagrammatic view in perspective of the FIG. 3 rod inserted inside a high-pressure compressor.

FIG. 4 shows the FIG. 3 device with the shaped portion 34 in alignment with the tip 17 of a rotor blade 14. In this figure, the upstream corner is shown without deformation at 62 and with deformation at 64.

In use, the shaped portion 34 is inserted through the endoscope orifice of the row of stationary vanes that is situated immediately upstream from the rotor blade that is to be examined. The tubular portion 58 is inserted in the endoscope orifice of a casing, and the annular portion 56 of the endpiece 54 comes into a radial abutment against the outer periphery of the boss 22 of the casing. The positioning of the endpiece 54 on the first branch 36 of the L-shape serves to monitor the extent to which the shaped portion 34 is inserted radially into the inside of the casing 18. When the endpiece 54 is in abutment against the boss 22, it ensures that the rod 32 is positioned and blocked inside the casing 18. The L-shaped portion of the rod enables the shaped portion 34 to be placed between two wheels having blades 14. Thereafter, the rotor is turned a little so that the shaped portion 34 is brought into alignment with the blade tip 17, the rim 60 of the end of the shaped portion 34 coming into abutment against the trailing edge 21 of the blade 14 (FIG. 4).

An endoscope 24 of the type described with reference to FIG. 2 is inserted into the tubular portion 58 of the endpiece 54 and its distal end is pointed downstream towards the deformed upstream corner 64 of the blade 14.

The extent of the deformation is measured as follows: the operator takes an image of the deformed zone and determines that the deformation of the upstream blade corner 64 begins level with such-and-such a colored line. By using the color-coded strip, as described above, it is possible to deduce the length of the deformation of the upstream blade corner 64 towards the blade tip.

Unlike the prior art, the orientation of the observation endoscope 24 relative to the upstream blade corner has no influence on the measurement of the deformation, since the shaped portion 34 is in alignment with the blade tip 17, it is very close thereto, and it incorporates visible marks for measuring distance along its length.

Figure 5:
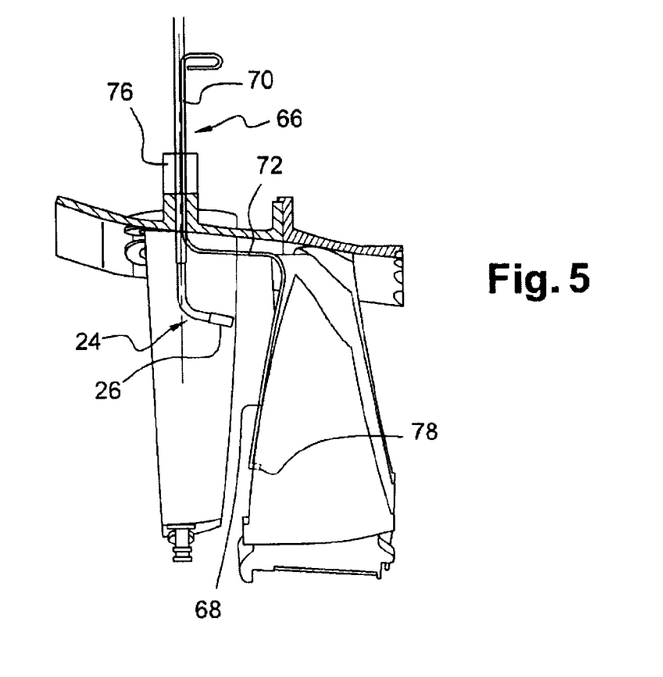
FIG. 5 is a diagrammatic view in perspective of a rod of the device of the invention inserted inside a high-pressure compressor for measuring the deformation of the leading edge of a blade.

FIG. 5 shows a rod 66 having a shaped portion 68 shaped to match the leading edge 19 of a rotor blade 14. Like the rod 32 described with reference to FIGS. 3 and 4, the rod 66 has two branches 70 and 72 in an L-shape. The shaped portion 68 is connected to the L-shaped portion substantially perpendicularly to the second branch 72 of the L-shape and it extends away from the first branch 70. The first branch 70 of the L-shape is also mounted on an endpiece 76 for positioning and radially blocking the shaped portion 68 of the rod inside the casing.

The free end of the shaped portion 68 of the rod 66 has a substantially perpendicular rim 78 that extends substantially in the same direction as the second branch 72 of the L-shape. When the rod is in the assembled position inside the casing, the rim 78 extends downstream and is substantially in alignment with the axis 12 of the high-pressure compressor 10.

When the rod 66 is inserted inside the casing 18, the rotor is turned so that the rim 78 of the free end of the shaped portion 68 comes to bear against the leading edge of the blade 14, thereby making it easier to align the shaped portion 66 with the leading edge 19 of the blade 14.

The deformation of the radially outer end of the leading edge 19 is measured by determining the line at which the deformation begins on the leading edge 19 of the blade 14. To do this, the operator takes an image of the deformed zone and determines that the deformation of the upstream blade corner 64 begins level with such-and-such a colored line. By using the color-coded strip, as described above, it is possible to deduce therefrom the magnitude of the deformation of the upstream blade corner 64 along the leading edge of the blade.

Figure 6:
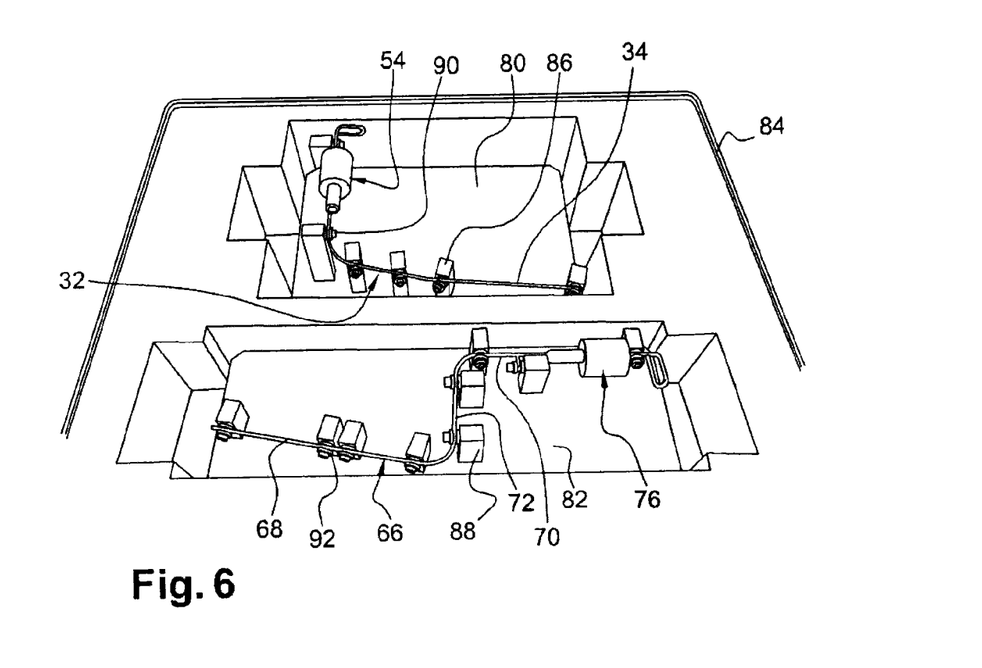
FIG. 6 is a diagrammatic view in perspective of the rods of FIGS. 4 and 5 received in a carrying case.
Figure 7:
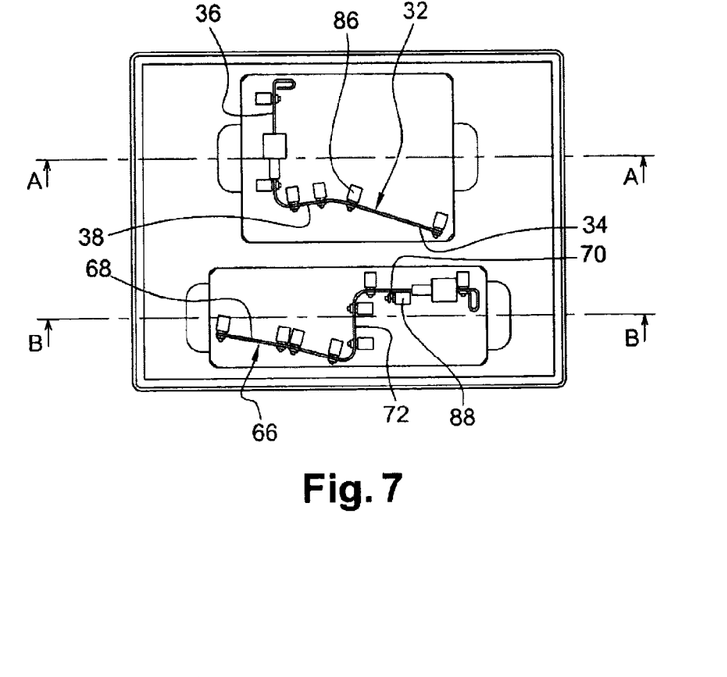
FIG. 7 is a plan view of the case.

The invention also provides a carrying case for carrying both the shaped rod 32 that is shaped to match the blade tip 17 and the shaped rod 66 that is shaped to match the leading edge 19 (FIGS. 6 and 7). This case has support means for the rods 32 and 66. These means comprise two plates 80 and 82 arranged side-by-side in a box 84. Each plate 80, 82 has a plurality of studs 86, 88 perpendicular to the plate, each stud having a support finger 90, 92 for supporting a rod. Each finger 90, 92 extends from a stud 86, 88 in a plane substantially parallel to the plate 80, 82. The studs 86, 88 are distributed over the plate 80, 82 and the fingers 90, 92 are positioned at respective heights relative to the plate 80, 82 such that the contact tips of the fingers 90, 92 of a plate 80, 82 for contacting a rod define a three-dimensional model of the profile of the edge of a calibration part.

Thus, the contact points of the fingers 90 of the plate 80 form a three-dimensional model of the profile of the tip 17 of a calibration blade 14, and the contact points of the fingers 92 of the plate 82 form a three-dimensional model of the profile of the leading edge 19 of a calibration blade.

Figure 8:
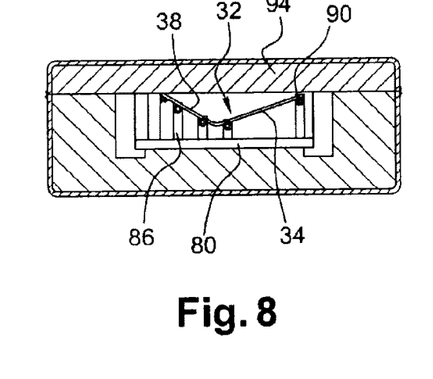
FIG. 8 is a diagrammatic view on section plane AA of FIG. 7.
Figure 9:
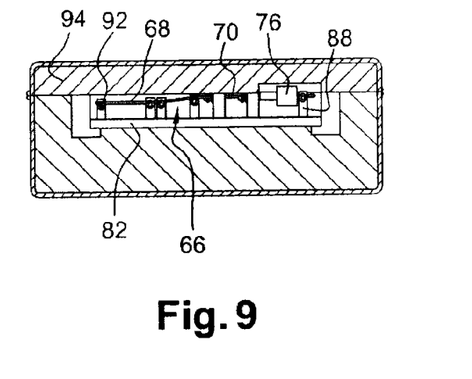
FIG. 9 is a diagrammatic view on section plane BB of FIG. 7.

In FIGS. 8 and 9, the various heights of the studs 86, 88 can clearly be seen. The rods 32, 66 are covered by a lid 94 for closing the box 84 in a carrying position.

These studs 86, 88 serve not only to transport the above-mentioned rods 32, 66 without risk of deformation, but also to perform a three-dimensional check on the shapes of the rods 32, 66 before and after use, i.e. a check on the longitudinal profile of the rod. This check is performed by verifying that each finger 90, 92 is indeed in contact with the rod 32, 66.

Checking the shape of the rod 32, 66 before use makes it possible to verify that it does indeed have the appropriate shape for measuring the deformation of the edge that is to be examined. Checking the shape of the rod 32, 66 after it has been extracted from inside the engine makes it possible to verify that the rod 32, 66 has not been deformed while being inserted into and extracted from the inside of the engine. These two verifications of shape thus make it possible to confirm that the measurement of deformation performed on the blade has been carried out using a rod 32, 66 in which the shaped portion 34, 68 does indeed have the shape of the edge to be examined.

Figure 10:
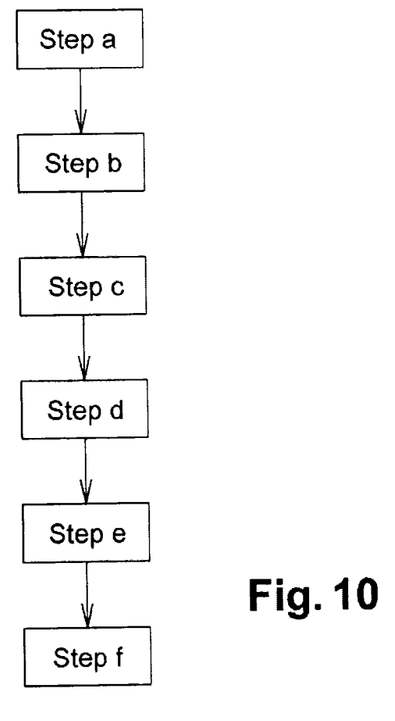
FIG. 10 is a flowchart of the various steps of the method of the invention.

According to the invention, the non-destructive inspection is performed using the successive steps shown in FIG. 10. In a first step a, the profile of the rod is initially checked in three dimensions with the help of the three-dimensional arrangement of the studs 86, 88. In a second step b, the rod is engaged in the endpiece 54, 76, which is inserted in the endoscope orifice of the casing of the engine. In a third step c, the shaped portion 34, 68 of the rod 32, 66 is positioned on the portion of the part for inspection that corresponds to the portion of the calibration part. In step d, the endoscope 24 is inserted inside the casing of the engine. In step e, the deformation of the portion of the part for inspection is measured with the help of the endoscope 24, and then in step f, the operator withdraws the rod from the inside of the engine and performs step a once more in order to verify that it has not suffered any deformation while it was in use during the preceding steps.

The invention is particularly advantageous when two rods 32, 66 are used in combination, one of the rods 32 having a shaped portion 34 matching a blade tip 17, thereby making it possible to have accurate information about the extent of the deformation along the tip 17 of the blade 14, and the other rod 66 having a shaped portion 68 matching the leading edge 19 of the same blade 14, thereby making it possible to have accurate information about the extent of the deformation along the leading edge 19 of the blade. In this way, the accuracy of the measurements is considerably improved compared with the accuracy with which deformation is measured in the prior art. These two deformation measurements are more accurate because use is made of a part 34, 68 that is shaped to match the shape of the edge for examination and that incorporates visible marks for remote measurement.

Figure 11:
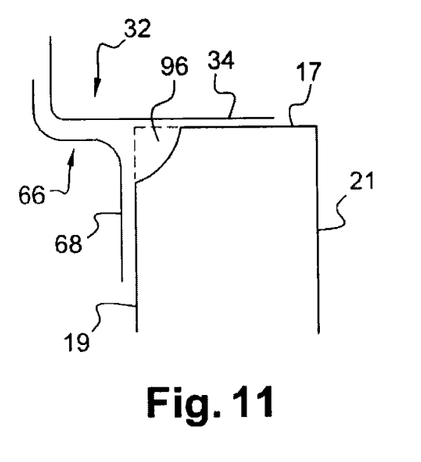
FIGS. 11 to 15 show various uses of the device of the invention.

Although the invention is particularly advantageous for measuring the deformation of an upstream blade corner, it can also be used when the upstream blade corner 96 has been broken off, as shown in FIG. 11. The dimensions of the broken-off portion 96 are measured in the same manner as that described above, by aligning the shaped portion 68 of the rod 66 along the leading edge 19 of the blade, and then by aligning the shaped portion 34 of the rod 32 along the blade tip 17.

Figure 12:
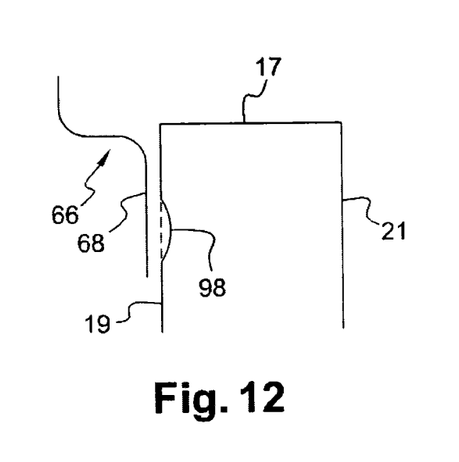
Figure 13:
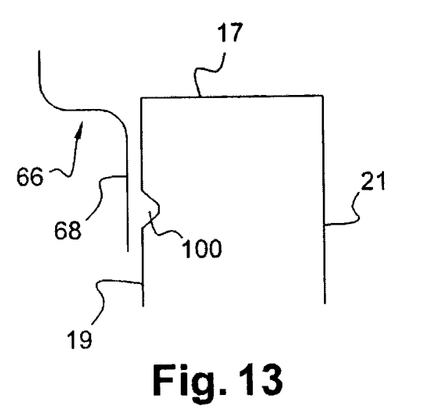

The leading edges 19 of blades may also suffer impacts that lead to a convex swelling 98 being formed on the pressure side face of the blade (FIG. 12) or to a portion 100 of the leading edge 19 of the blade being broken off (FIG. 13). Either way, the use of a rod 66 having a portion 68 that is shaped to match the leading edge 19 makes it possible to determine the position of the swelling or of the broken-off portion 100 along the leading edge 19, and also to measure its extent (FIGS. 11 and 12).

Figure 14:
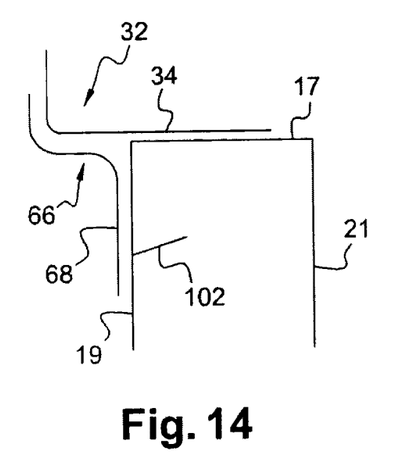

The invention is also applicable to measuring the deformation of a portion other than an edge of a part. By way of example, the deformation of the part may consist in a crack extending over the pressure side face of the blade from the leading edge 19 of the blade towards the trailing edge 21. The use of a rod 66 having a portion 68 that is shaped to match the leading edge 19 makes it possible to determine the position of the crack 102 along the leading edge 19, and also to measure its extent along the leading edge 19. The use of a rod 32 with a portion 34 shaped to match the blade tip 17 makes it possible to measure the extent of the deformation between the leading edge 19 and the trailing edge 21 (FIG. 14).

Figure 15:
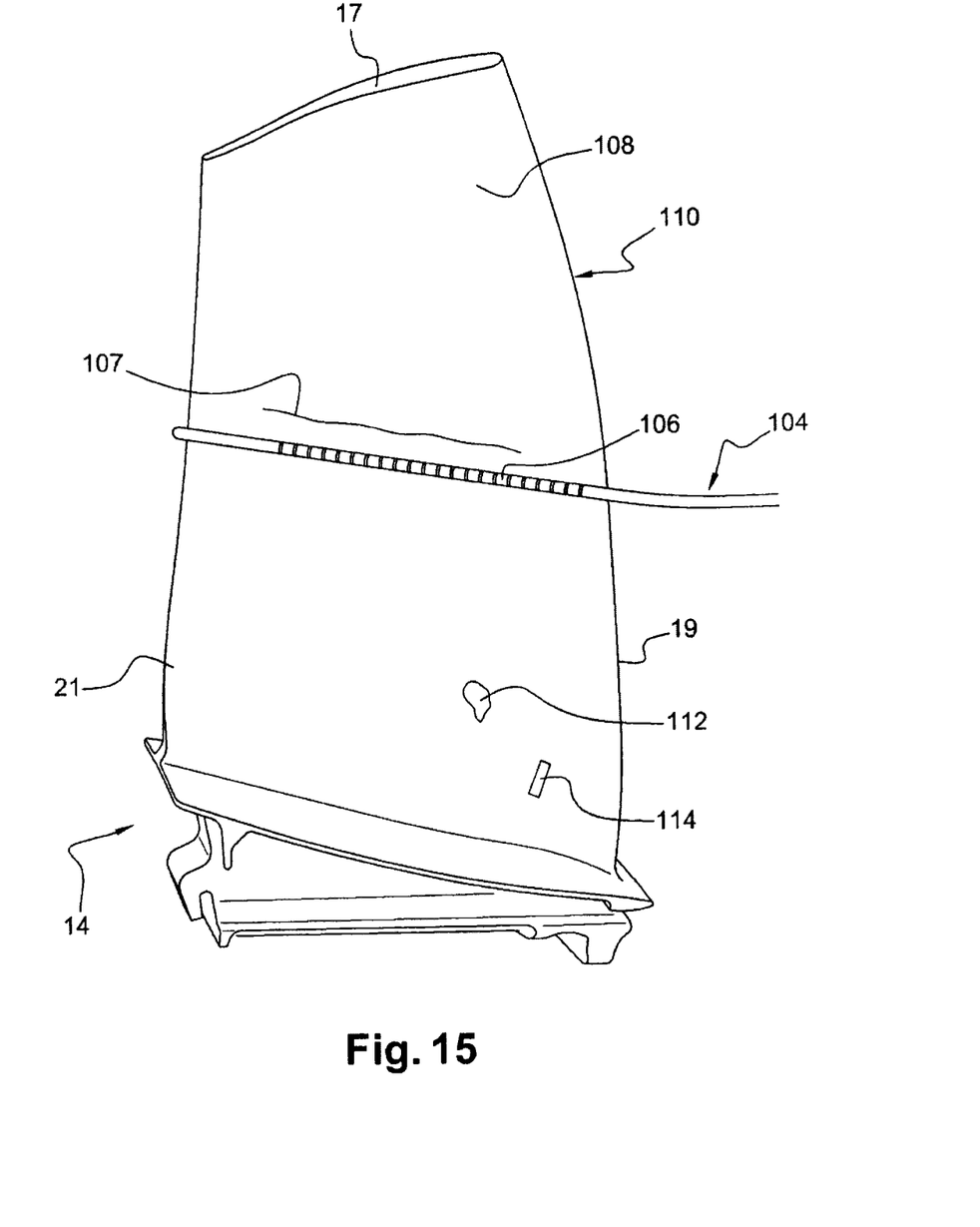

It is also possible to measure the longitudinal extent of a crack 107 with the help of a rod 104 having a shaped portion 106 that is shaped to match the longitudinal profile of the pressure side face 108 of the airfoil 110 of the blade 14 at a given position up the height of the airfoil 110. In this way, the shaped portion 106 is accurately aligned with the pressure side face, thus making it possible to place the visible marks of the shaped portion 106 as close as possible to the crack, thereby enabling its longitudinal extent to be measured accurately (FIG. 15). Given that the longitudinal profile of the pressure side face 108 of the blade 14 varies between the inner and outer ends of the airfoil 110, it may be desirable to have a plurality of rods, each having a shaped portion that is shaped to match a longitudinal profile along the pressure side face 108 of the blade 14, this profile being determined for a given position along the height of the airfoil 110.

In an example of a sequence for measuring the extent of a crack, the operator uses the rod 66 with a shaped portion 68 matching the leading edge 19 of the blade in order to determine the radial position of the crack along the blade. In this way, the operator can then select the rod 104 in which the shaped portion matches the longitudinal profile of the airfoil at the radial position of the crack.

It can also be found useful to use a rod having a portion shaped to match the longitudinal profile of the pressure side face of a blade in order to measure the extent of damage such as an impact 112, 114 against the pressure side face 108 of the airfoil 110 (FIG. 15).

The invention is also applicable to measuring the deformation of a trailing edge 21 of a blade 14 or the downstream corner of a rotor blade 14. The invention is also suitable for measuring damage (impact, cracking, deformation . . . ) of the suction side face of the blade, and also damage to other edges inside a turbine engine, such as the leading edges or the trailing edges of guide vanes 16.

Although the invention is described above with reference to parts of a compressor, the invention is equally applicable to other sections of a turbine engine, and in particular to vanes or blades of a high-pressure turbine or of a low-pressure turbine located downstream from a combustion chamber.

The invention claimed is:

1. A method of measuring deformation of a part in a turbine engine by a device including a rod including a portion with a profile that corresponds to a profile of a portion of a calibration part of same type as a part under examination, the portion of the rod further including visible marks for remote measurement arranged along its length, the method comprising:
   a) inspecting the profile of the rod in three dimensions with help of a three-dimensional model of the profile of the portion of the calibration part;
   b) engaging the rod in an endoscope orifice in a casing of the engine;
   c) positioning and fastening the portion of the rod on the portion of the part for inspection that corresponds to the portion of the calibration part;
   d) introducing an endoscope inside the casing of the engine;
   e) measuring deformation of the portion of the part for inspection with help of the endoscope; and then
   f) withdrawing the rod from the inside of the engine casing and performing the a) inspecting once more to verify that the rod has not been subjected to deformation during the b) engaging.

2. A method according to claim 1, wherein the part is a blade of a rotor in an engine, and the method is performed on first and second portions of the blade in succession, the first portion is a leading edge of the blade and the second portion is a tip of the blade.

3. A method according to claim 1, wherein, the part is a rotor blade in an engine and the rod is shaped to match the leading edge of the blade, and the rotor is turned until a rim of a free end of the portion of the rod comes into contact with a suction side face of the blade to align the portion of the rod with a leading edge of the blade.

4. A method according to claim 1, wherein the visible marks for remote measurement comprise graduations that are regularly distributed along a length of the rod portion.

5. A method according to claim 4, wherein each graduation is made in a form of a colored line with a color of each line differing from colors of adjacent colored lines.

6. A method according to claim 1, wherein the device includes fastening and positioning means for fastening and positioning the rod portion in a stationary position in alignment with the portion of the part under examination that corresponds to the portion of the calibration part.

7. A method according to claim 6, wherein, the part is a rotor blade arranged inside a casing of a turbine engine, and the fastening and positioning means comprises an endpiece engaged on the end of the rod remote from the shaped portion of the rod, the endpiece being fastened in an endoscope orifice in the casing of the engine and including an orifice for passing the endoscope.

8. A method according to claim 6, wherein the positioning means includes a rim arranged at a free end of the portion of the rod and serving as an abutment for positioning the rod on the part under examination.

9. A method according to claim 1, wherein the portion is connected to a second portion of the rod that is L-shaped.

10. A method according to claim 9, wherein the portion of the rod follows the profile of a tip of a rotor blade and is inclined relative to a branch to which it is connected.

11. A method according to claim 9, wherein the portion of the rod follows a profile of a leading edge of a rotor blade and it extends substantially perpendicularly to a branch of the L-shape to which it is connected and in a direction going away from an other branch of the L shape.

12. A device for performing the method according to claim 1, comprising:
- a rod including a portion with a profile that corresponds to a profile of a portion of a calibration part of same type as a part under examination,
- the portion of the rod further comprising visible marks for remote measurement arranged along its length; and
- fastening and positioning means for fastening and positioning the rod portion in a stationary position in alignment with the portion of the part under examination that corresponds to the portion of the calibration part.

13. A case for carrying the device according to claim 12, comprising:
- support means for supporting at least one rod, the support means comprising a plurality of studs, each supporting the rod at a predetermined height such that contact points where the support studs make contact with the rod define a three-dimensional model of a profile of a portion of the calibration part.

* * * * *